United States Patent
Min et al.

(10) Patent No.: US 8,214,617 B2
(45) Date of Patent: Jul. 3, 2012

(54) APPARATUS AND METHOD OF AVOIDING BANK CONFLICT IN SINGLE-PORT MULTI-BANK MEMORY SYSTEM

(75) Inventors: Kyoung-june Min, Yongin-si (KR); Chan-min Park, Seongnam-si (KR); Suk-jin Kim, Seoul (KR); Won-jong Lee, Suwon-si (KR); Kwon-taek Kwon, Seoul (KR); Hee-seok Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 822 days.

(21) Appl. No.: 12/071,910

(22) Filed: Feb. 27, 2008

(65) Prior Publication Data
US 2009/0089551 A1 Apr. 2, 2009

(30) Foreign Application Priority Data
Oct. 1, 2007 (KR) .......................... 10-2007-0098952

(51) Int. Cl.
*G06F 12/00* (2006.01)

(52) U.S. Cl. .................. 711/170; 711/157; 712/215

(58) Field of Classification Search .................. 711/157, 711/170; 712/215
See application file for complete search history.

(56) References Cited

U.S. PATENT DOCUMENTS

| | | | |
|---|---|---|---|
| 5,559,970 A * | 9/1996 | Sharma | 710/317 |
| 6,144,604 A | 11/2000 | Haller et al. | |
| 6,678,789 B2 | 1/2004 | Shibayama | |
| 6,695,506 B2 | 2/2004 | Yamamoto | |
| 2008/0140980 A1 * | 6/2008 | Mei et al. | 711/170 |

FOREIGN PATENT DOCUMENTS

| | | |
|---|---|---|
| JP | 09-006759 | 1/1997 |
| JP | 10-307787 | 11/1998 |
| JP | 11-232078 | 8/1999 |
| JP | 2001-290702 | 10/2001 |
| KR | 10-2002-0059716 | 7/2002 |
| WO | WO 2007003370 A2 * | 1/2007 |

* cited by examiner

Primary Examiner — Yong Choe
(74) Attorney, Agent, or Firm — Staas & Halsey LLP

(57) ABSTRACT

Provided are a method and apparatus for avoiding bank conflict. A first instruction that is one of access instructions that are predicted to cause the bank conflict is replaced with a second instruction by changing an execute timing of the first instruction to a timing prior to the execute timing of the first instruction so as for the access instructions not to cause the bank conflict. Next, a load/store unit that is scheduled to access the bank according to the first instruction accesses the bank and reads out a data from the bank at an execute timing of the second instruction, and after that, the load/store unit is allowed to be inputted the read data at the execute timing of the first instruction. Accordingly, although the access instructions that are predicted to cause the bank conflict are allocated to the load/store units, the bank conflict can be prevented, so that it is possible to avoid deterioration in performance due the occurrence of the bank conflict.

13 Claims, 21 Drawing Sheets

FIG. 2
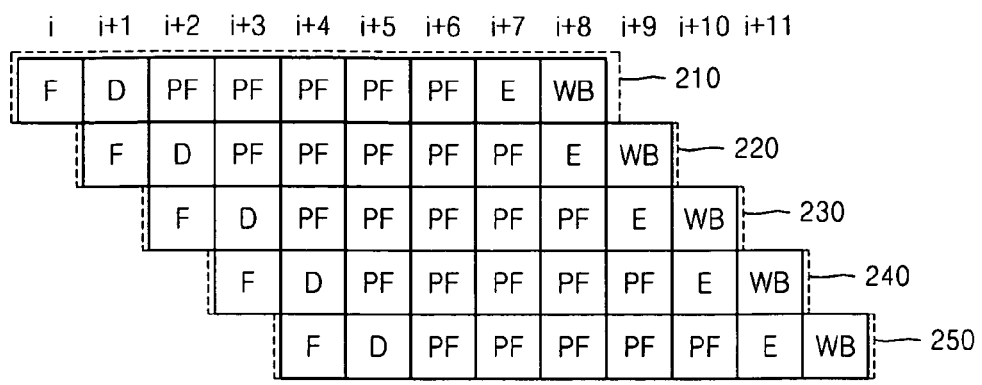
FIG. 3A  FIG. 3B  FIG. 3C
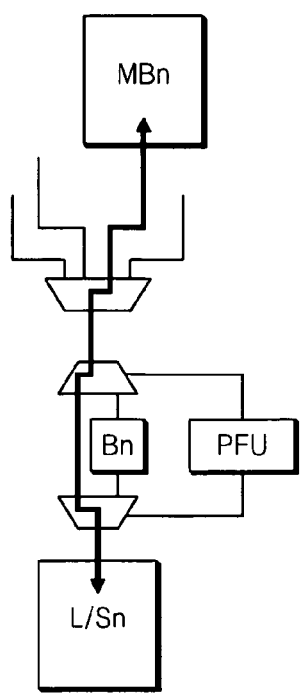 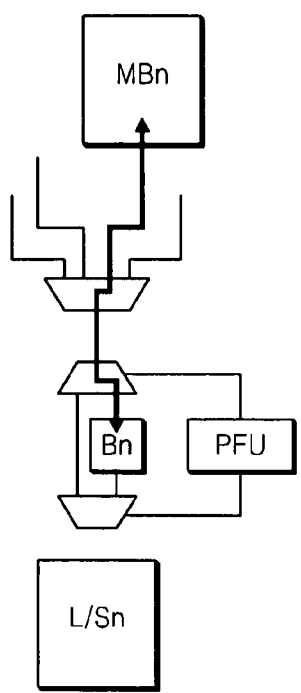 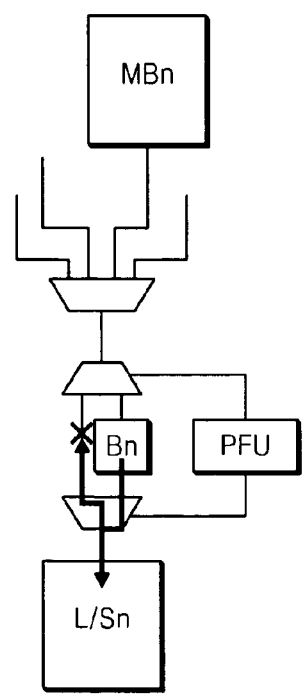

| | MB0 | | | | MB1 | | | | MB2 | | | | MB3 | | | |
|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 |
| 410 | 1 | 0 | 0 | 0 | 0 | 1 | 0 | 0 | 0 | 0 | 1 | 0 | 0 | 0 | 0 | 0 |
| 420 | 0 | 1 | 1 | 0 | 0 | 0 | 0 | 0 | 0 | 0 | 0 | 0 | 0 | 0 | 0 | 0 |
| 430 | 0 | 0 | 0 | 0 | 0 | 0 | 0 | 0 | 0 | 1 | 0 | 1 | 0 | 0 | 0 | 0 |
| 440 | 0 | 0 | 0 | 0 | 0 | 0 | 0 | 0 | 0 | 0 | 0 | 0 | 1 | 0 | 1 | 1 |

1 : Memory Request
0: Idle

| MB0 | | | | MB1 | | | | MB2 | | | | MB3 | | | |
|---|---|---|---|---|---|---|---|---|---|---|---|---|---|---|---|
| L0 | L1 | L2 | L3 | L0 | L1 | L2 | L3 | L0 | L1 | L2 | L3 | L0 | L1 | L2 | L3 |
| 1 | 0 | 0 | 0 | 0 | 1 | 0 | 0 | 0 | 0 | 1 | 0 | 0 | 0 | 0 | 0 |
| 0 | 1 | 1 | 0 | 0 | 0 | 0 | 0 | 0 | 0 | 0 | R | R | 0 | 0 | 0 |
| 0 | 0 | 0 | 0 | 0 | 0 | 0 | 0 | 0 | 1 | 0 | | 0 | 0 | R | 0 |
| 0 | 0 | 0 | 0 | 0 | 0 | 0 | 0 | 0 | 0 | 0 | 0 | 0 | 0 | 0 | 1 |

| | MB0 | | | | MB1 | | | | MB2 | | | | MB3 | | | |
|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 |
| 610 | 1 | 1 | 1 | 1 | 1 | 1 | 1 | 1 | 1 | 1 | 1 | 1 | 1 | 1 | 1 | 0 |
| 620 | 1 | 1 | 1 | 1 | 0 | 1 | 1 | 0 | 0 | 1 | 1 | 0 | 0 | 1 | 1 | 0 |
| 630 | 0 | 1 | 0 | 1 | 0 | 1 | 0 | 1 | 1 | 1 | 1 | 1 | 0 | 1 | 0 | 1 |
| 640 | 1 | 0 | 1 | 1 | 1 | 0 | 1 | 1 | 1 | 0 | 1 | 1 | 1 | 1 | 1 | 1 |

| MB0 | | | | MB1 | | | | MB2 | | | | MB3 | | | |
|---|---|---|---|---|---|---|---|---|---|---|---|---|---|---|---|
| L0 | L1 | L2 | L3 | L0 | L1 | L2 | L3 | L0 | L1 | L2 | L3 | L0 | L1 | L2 | L3 |
| 1 | 1 | 1 | 1 | 1 | 1 | 1 | 1 | 1 | 1 | 1 | 1 | 1 | 1 | 1 | 0 |
| 1 | 1 | 1 | 1 | 0 | 1 | 1 | 0 | 0 | 1 | 1 | R | R | 1 | 1 | 0 |
| 0 | 1 | 0 | 1 | 0 | 1 | 0 | 1 | 1 | 1 | 1 | D | C | 1 | 1 | 1 |
| 1 | 0 | 1 | 1 | 1 | 0 | 1 | 1 | 1 | 0 | 1 | 1 | D | 1 | 1 | 1 |

FIG. 8A

| | MB0 | | | | MB1 | | | | MB2 | | | | MB3 | | | |
|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 |
| 800 | 0 | 0 | 0 | 0 | 0 | 0 | 0 | 0 | 0 | 0 | 0 | 0 | 0 | 0 | 0 | 0 |

FIG. 8B

PFT

| | MB0 | | | | MB1 | | | | MB2 | | | | MB3 | | | |
|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 |
| 802 | 0 | 0 | 0 | 0 | 0 | 0 | 0 | 0 | 0 | 0 | 0 | 0 | 0 | 0 | 0 | 0 |
| 812 | 0 | 0 | 0 | 0 | 0 | 0 | 0 | 0 | 0 | 0 | 0 | 0 | 0 | 0 | 0 | 0 |
| 822 | 0 | 0 | 0 | 0 | 0 | 0 | 0 | 0 | 0 | 0 | 0 | 0 | 0 | 0 | 0 | 0 |
| 832 | 1 | 0 | 0 | 0 | 0 | 1 | 0 | 0 | 0 | 0 | 1 | 0 | 0 | 0 | 0 | 0 |

FIG. 8C

Masked PFT

| | MB0 | | | | MB1 | | | | MB2 | | | | MB3 | | | |
|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 |
| 804 | 0 | 0 | 0 | 0 | 0 | 0 | 0 | 0 | 0 | 0 | 0 | 0 | 0 | 0 | 0 | 0 |
| 814 | 0 | 0 | 0 | 0 | 0 | 0 | 0 | 0 | 0 | 0 | 0 | 0 | 0 | 0 | 0 | 0 |
| 824 | 0 | 0 | 0 | 0 | 0 | 0 | 0 | 0 | 0 | 0 | 0 | 0 | 0 | 0 | 0 | 0 |
| 832 | 1 | 0 | 0 | 0 | 0 | 1 | 0 | 0 | 0 | 0 | 1 | 0 | 0 | 0 | 0 | 0 |

FIG. 9A

| | MB0 | | | | MB1 | | | | MB2 | | | | MB3 | | | |
|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 |
| 802 | 0 | 0 | 0 | 0 | 0 | 0 | 0 | 0 | 0 | 0 | 0 | 0 | 0 | 0 | 0 | 0 |

FIG. 9B

PFT

| | MB0 | | | | MB1 | | | | MB2 | | | | MB3 | | | |
|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 |
| 812 | 0 | 0 | 0 | 0 | 0 | 0 | 0 | 0 | 0 | 0 | 0 | 0 | 0 | 0 | 0 | 0 |
| 822 | 0 | 0 | 0 | 0 | 0 | 0 | 0 | 0 | 0 | 0 | 0 | 0 | 0 | 0 | 0 | 0 |
| 832 | 1 | 0 | 0 | 0 | 0 | 1 | 0 | 0 | 0 | 0 | 1 | 0 | 0 | 0 | 0 | 0 |
| 842 | 0 | 1 | 1 | 0 | 0 | 0 | 0 | 0 | 0 | 0 | 0 | 0 | 0 | 0 | 0 | 0 |

FIG. 9C

Masked PFT

| | MB0 | | | | MB1 | | | | MB2 | | | | MB3 | | | |
|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 |
| 814 | 0 | 0 | 0 | 0 | 0 | 0 | 0 | 0 | 0 | 0 | 0 | 0 | 0 | 0 | 0 | 0 |
| 824 | 0 | 0 | 0 | 0 | 0 | 0 | 0 | 0 | 0 | 0 | 0 | 0 | 0 | 0 | 0 | 0 |
| 834 | 1 | 1 | 1 | 1 | 1 | 1 | 1 | 1 | 1 | 1 | 1 | 1 | 1 | 1 | 1 | 0 |

| 842 | 0 | 1 | 1 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|

FIG. 10A

| | MB0 | | | | MB1 | | | | MB2 | | | | MB3 | | | |
|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 |
| 812 | 0 | 0 | 0 | 0 | 0 | 0 | 0 | 0 | 0 | 0 | 0 | 0 | 0 | 0 | 0 | 0 |

FIG. 10B

PFT

| | MB0 | | | | MB1 | | | | MB2 | | | | MB3 | | | |
|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 |
| 822 | 0 | 0 | 0 | 0 | 0 | 0 | 0 | 0 | 0 | 0 | 0 | 0 | 0 | 0 | 0 | 0 |
| 832 | 1 | 0 | 0 | 0 | 0 | 1 | 0 | 0 | 0 | 0 | 1 | 0 | 0 | 0 | 0 | 0 |
| 842 | 0 | 1 | 1 | 0 | 0 | 0 | 0 | 0 | 0 | 0 | 0 | 0 | 0 | 0 | 0 | 0 |
| 852 | 0 | 0 | 0 | 0 | 0 | 0 | 0 | 0 | 0 | 1 | 0 | 1 | 0 | 0 | 0 | 0 |

FIG. 10C

Masked PFT

| | MB0 | | | | MB1 | | | | MB2 | | | | MB3 | | | |
|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 |
| 824 | 0 | 0 | 0 | 0 | 0 | 0 | 0 | 0 | 0 | 0 | 0 | 0 | 0 | 0 | 0 | 0 |
| 834 | 1 | 1 | 1 | 1 | 1 | 1 | 1 | 1 | 1 | 1 | 1 | 1 | 1 | 1 | 1 | 0 |
| 844 | 1 | 1 | 1 | 1 | 0 | 1 | 1 | 0 | 0 | 1 | 1 | 0 | 0 | 1 | 1 | 0 |

| | MB0 | | | | MB1 | | | | MB2 | | | | MB3 | | | |
|---|---|---|---|---|---|---|---|---|---|---|---|---|---|---|---|---|
| 852 | 0 | 0 | 0 | 0 | 0 | 0 | 0 | 0 | 0 | 1 | 0 | 1 | 0 | 0 | 0 | 0 |

FIG. 10D

PFT

| | MB0 | | | | MB1 | | | | MB2 | | | | MB3 | | | |
|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 |
| 822 | 0 | 0 | 0 | 0 | 0 | 0 | 0 | 0 | 0 | 0 | 0 | 0 | 0 | 0 | 0 | 0 |
| 832 | 1 | 0 | 0 | 0 | 0 | 1 | 0 | 0 | 0 | 0 | 1 | 0 | 0 | 0 | 0 | 0 |
| 842 | 0 | 1 | 1 | 0 | 0 | 0 | 0 | 0 | 0 | 0 | 0 | P | 0 | 0 | 0 | 0 |
| 852 | 0 | 0 | 0 | 0 | 0 | 0 | 0 | 0 | 0 | 1 | 0 | D | 0 | 0 | 0 | 0 |

FIG. 11A

| | MB0 | | | | MB1 | | | | MB2 | | | | MB3 | | | |
|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 |
| 822 | 0 | 0 | 0 | 0 | 0 | 0 | 0 | 0 | 0 | 0 | 0 | 0 | 0 | 0 | 0 | 0 |

FIG. 11B

PFT

| | MB0 | | | | MB1 | | | | MB2 | | | | MB3 | | | |
|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 |
| 832 | 1 | 0 | 0 | 0 | 0 | 1 | 0 | 0 | 0 | 0 | 1 | 0 | 0 | 0 | 0 | 0 |
| 842 | 0 | 1 | 1 | 0 | 0 | 0 | 0 | 0 | 0 | 0 | 0 | P | 0 | 0 | 0 | 0 |
| 852 | 0 | 0 | 0 | 0 | 0 | 0 | 0 | 0 | 0 | 1 | 0 | 0 | 0 | 0 | 0 | 0 |
| 862 | 0 | 0 | 0 | 0 | 0 | 0 | 0 | 0 | 0 | 0 | 0 | 0 | 1 | 0 | 1 | 1 |

FIG. 11C

Masked PFT

| | MB0 | | | | MB1 | | | | MB2 | | | | MB3 | | | |
|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 |
| 834 | 1 | 1 | 1 | 1 | 1 | 1 | 1 | 1 | 1 | 1 | 1 | 1 | 1 | 1 | 1 | 0 |
| 844 | 1 | 1 | 1 | 1 | 0 | 1 | 1 | 1 | 1 | 1 | 1 | 1 | 0 | 1 | 1 | 1 |
| 854 | 0 | 1 | 0 | 1 | 0 | 1 | 0 | 1 | 1 | 1 | 1 | 1 | 0 | 1 | 0 | 1 |
| 862 | 0 | 0 | 0 | 0 | 0 | 0 | 0 | 0 | 0 | 0 | 0 | 0 | 1 | 0 | 1 | 1 |

FIG. 11D

PFT

| | MB0 | | | | MB1 | | | | MB2 | | | | MB3 | | | |
|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 |
| 832 | 1 | 0 | 0 | 0 | 0 | 1 | 0 | 0 | 0 | 0 | 1 | 0 | 0 | 0 | 0 | 0 |
| 842 | 0 | 1 | 1 | 0 | 0 | 0 | 0 | 0 | 0 | 0 | 0 | P | P | 0 | 0 | 0 |
| 852 | 0 | 0 | 0 | 0 | 0 | 0 | 0 | 0 | 0 | 1 | 0 | D | 0 | 0 | P | 0 |
| 862 | 0 | 0 | 0 | 0 | 0 | 0 | 0 | 0 | 0 | 0 | 0 | 0 | D | 0 | D | 1 |

FIG. 12A

| | MB0 | | | | MB1 | | | | MB2 | | | | MB3 | | | |
|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 |
| 832 | 1 | 0 | 0 | 0 | 0 | 1 | 0 | 0 | 0 | 0 | 1 | 0 | 0 | 0 | 0 | 0 |

FIG. 12B

PFT

| | MB0 | | | | MB1 | | | | MB2 | | | | MB3 | | | |
|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 |
| 842 | 0 | 1 | 1 | 0 | 0 | 0 | 0 | 0 | 0 | 0 | 0 | P | P | 0 | 0 | 0 |
| 852 | 0 | 0 | 0 | 0 | 0 | 0 | 0 | 0 | 0 | 1 | 0 | D | 0 | 0 | P | 0 |
| 862 | 0 | 0 | 0 | 0 | 0 | 0 | 0 | 0 | 0 | 0 | 0 | 0 | D | 0 | D | 1 |
| 872 | 0 | 0 | 0 | 0 | 0 | 0 | 0 | 0 | 0 | 0 | 0 | 0 | 0 | 0 | 0 | 0 |

FIG. 12C

Masked PFT

| | MB0 | | | | MB1 | | | | MB2 | | | | MB3 | | | |
|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 |
| 844 | 1 | 1 | 1 | 1 | 1 | 1 | 1 | 1 | 1 | 1 | 1 | 1 | 1 | 1 | 1 | 1 |
| 854 | 0 | 1 | 1 | 0 | 0 | 1 | 1 | 0 | 1 | 1 | 1 | 1 | 1 | 1 | 1 | 1 |
| 864 | 0 | 0 | 0 | 1 | 0 | 0 | 0 | 1 | 0 | 0 | 0 | 1 | 1 | 1 | 1 | 1 |

| 872 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|

FIG. 13A

| MB0 | | | | MB1 | | | | MB2 | | | | MB3 | | | |
|---|---|---|---|---|---|---|---|---|---|---|---|---|---|---|---|
| L0 | L1 | L2 | L3 | L0 | L1 | L2 | L3 | L0 | L1 | L2 | L3 | L0 | L1 | L2 | L3 |
| 0 | 1 | 1 | 0 | 0 | 0 | 0 | 0 | 0 | 0 | 0 | P | P | 0 | 0 | 0 |

PFT

| MB0 | | | | MB1 | | | | MB2 | | | | MB3 | | | |
|---|---|---|---|---|---|---|---|---|---|---|---|---|---|---|---|
| L0 | L1 | L2 | L3 | L0 | L1 | L2 | L3 | L0 | L1 | L2 | L3 | L0 | L1 | L2 | L3 |
| 0 | 0 | 0 | 0 | 0 | 0 | 0 | 0 | 0 | 1 | 0 | D | 0 | 0 | P | 0 |
| 0 | 0 | 0 | 0 | 0 | 0 | 0 | 0 | 0 | 0 | 0 | 0 | D | 0 | D | 1 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

Masked PFT

| | MB0 | | | | MB1 | | | | MB2 | | | | MB3 | | | |
|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 |
| 854 | 0 | 1 | 1 | 0 | 0 | 1 | 1 | 0 | 1 | 1 | 1 | 1 | 1 | 1 | 1 | 1 |
| 864 | 0 | 0 | 0 | 1 | 0 | 0 | 0 | 1 | 0 | 0 | 0 | 1 | 1 | 1 | 1 | 1 |
| 874 | 0 | 0 | 0 | 0 | 0 | 0 | 0 | 0 | 0 | 0 | 0 | 0 | 0 | 0 | 0 | 0 |

| 882 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|

FIG. 14A

| | MB0 | | | | MB1 | | | | MB2 | | | | MB3 | | | |
|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 |
| 852 | 0 | 0 | 0 | 0 | 0 | 0 | 0 | 0 | 0 | 1 | 0 | D | 0 | 0 | P | 0 |

FIG. 14B

PFT

| | MB0 | | | | MB1 | | | | MB2 | | | | MB3 | | | |
|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 |
| 862 | 0 | 0 | 0 | 0 | 0 | 0 | 0 | 0 | 0 | 0 | 0 | 0 | D | 0 | D | 1 |
| 872 | 0 | 0 | 0 | 0 | 0 | 0 | 0 | 0 | 0 | 0 | 0 | 0 | 0 | 0 | 0 | 0 |
| 882 | 0 | 0 | 0 | 0 | 0 | 0 | 0 | 0 | 0 | 0 | 0 | 0 | 0 | 0 | 0 | 0 |
| 892 | 0 | 0 | 0 | 0 | 0 | 0 | 0 | 0 | 0 | 0 | 0 | 0 | 0 | 0 | 0 | 0 |

FIG. 14C

Masked PFT

| | MB0 | | | | MB1 | | | | MB2 | | | | MB3 | | | |
|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 |
| 864 | 0 | 0 | 0 | 1 | 0 | 0 | 0 | 1 | 0 | 0 | 0 | 1 | 1 | 1 | 1 | 1 |
| 874 | 0 | 0 | 0 | 0 | 0 | 0 | 0 | 0 | 0 | 0 | 0 | 0 | 0 | 0 | 0 | 0 |
| 884 | 0 | 0 | 0 | 0 | 0 | 0 | 0 | 0 | 0 | 0 | 0 | 0 | 0 | 0 | 0 | 0 |

| 892 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|

FIG. 15A

| | MB0 | | | | MB1 | | | | MB2 | | | | MB3 | | | |
|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 |
| 862 | 0 | 0 | 0 | 0 | 0 | 0 | 0 | 0 | 0 | 0 | 0 | 0 | D | 0 | D | 1 |

FIG. 15B

PFT

| | MB0 | | | | MB1 | | | | MB2 | | | | MB3 | | | |
|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 |
| 872 | 0 | 0 | 0 | 0 | 0 | 0 | 0 | 0 | 0 | 0 | 0 | 0 | 0 | 0 | 0 | 0 |
| 882 | 0 | 0 | 0 | 0 | 0 | 0 | 0 | 0 | 0 | 0 | 0 | 0 | 0 | 0 | 0 | 0 |
| 892 | 0 | 0 | 0 | 0 | 0 | 0 | 0 | 0 | 0 | 0 | 0 | 0 | 0 | 0 | 0 | 0 |
| 896 | 0 | 0 | 0 | 0 | 0 | 0 | 0 | 0 | 0 | 0 | 0 | 0 | 0 | 0 | 0 | 0 |

FIG. 15C

Masked PFT

| | MB0 | | | | MB1 | | | | MB2 | | | | MB3 | | | |
|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 |
| 874 | 0 | 0 | 0 | 0 | 0 | 0 | 0 | 0 | 0 | 0 | 0 | 0 | 0 | 0 | 0 | 0 |
| 884 | 0 | 0 | 0 | 0 | 0 | 0 | 0 | 0 | 0 | 0 | 0 | 0 | 0 | 0 | 0 | 0 |
| 894 | 0 | 0 | 0 | 0 | 0 | 0 | 0 | 0 | 0 | 0 | 0 | 0 | 0 | 0 | 0 | 0 |

| 896 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|

US 8,214,617 B2

APPARATUS AND METHOD OF AVOIDING BANK CONFLICT IN SINGLE-PORT MULTI-BANK MEMORY SYSTEM

CROSS-REFERENCE TO RELATED PATENT APPLICATION

This application claims the priority of Korean Patent Application No. 2007-0098952, filed on Oct. 1, 2007, in the Korean Intellectual Property Office, the disclosure of which is incorporated herein in its entirety by reference.

BACKGROUND OF THE INVENTION

1. Field of the Invention

The present invention relates to data access to a memory, and more particularly, to an apparatus and method of controlling access to single-port multi-bank memory system.

2. Description of the Related Art

Recently, with increasing demands for processors capable of simultaneously processing a large amount of data, some of the processors have been designed to simultaneously access multiple banks. Such a process includes multiple load/store units, each of which can access one bank. One bank is accessed by only one load/store unit. That is, one bank cannot be accessed by multiple load/store units.

However, there are some cases where multiple load/store units need to access the same bank. In these cases, bank conflict occurs. Frequent occurrence of bank conflict is one of the main causes of deterioration in performance of the processor. Therefore, in a case where the occurrence of bank conflict is predicted, there is needed an approach for avoiding the bank conflict.

SUMMARY OF THE INVENTION

The present invention provides an apparatus for avoiding bank conflict when occurrence of the bank conflict is predicted.

The present invention also provides a method of avoiding bank conflict when occurrence of the bank conflict is predicted.

The present invention also provides a computer-readable medium having embodied thereon a computer program for avoiding bank conflict when occurrence of the bank conflict is predicted.

According to an aspect of the present invention, there is provided an apparatus for avoiding bank conflict comprising: at least one bank which is prepared in advance; load/store units, each of which can access one bank according to access instructions allocated to the load/store units; a scheduling unit which replaces a first instruction that is one of the access instructions instructing at least a portion of the load/store units to access the same bank among the access instructions with a second instruction by changing an execute timing of the first instruction to a timing prior to the execute timing of the first instruction so as for the access instructions instructing at least a portion of the load/store units to access the same bank not to instruct at least a portion of the load/store units to access the same bank; and a switching unit which allows one of the load/store units to be inputted a data that is read out from the bank according to the second instruction at the execute timing of the first instruction.

According to another aspect of the present invention, there is provided a method of avoiding bank conflict in load/store units which can access one of at least one of banks that are prepared in advance according to access instructions allocated to the load/store units, the method comprising: replacing a first instruction that is one of the access instructions instructing at least a portion of the load/store units to access the same bank among the access instructions with a second instruction by changing an execute timing of the first instruction to a timing prior to the execute timing of the first instruction so as for the access instructions instructing at least a portion of the load/store units to access the same bank not to instruct at least a portion of the load/store units to access the same bank; and allowing one of the load/store units to be inputted a data that is read out from the bank according to the second instruction at the execute timing of the first instruction.

According to another aspect of the present invention, there is provided a computer-readable medium having embodied thereon a computer program for a method of avoiding bank conflict in load/store units which can access one of at least one of banks that are prepared in advance according to access instructions allocated to the load/store units, the method comprising: replacing a first instruction that is one of the access instructions instructing at least a portion of the load/store units to access the same bank among the access instructions with a second instruction by changing an execute timing of the first instruction to a timing prior to the execute timing of the first instruction so as for the access instructions instructing at least a portion of the load/store units to access the same bank not to instruct at least a portion of the load/store units to access the same bank; and allowing one of the load/store units to be inputted a data that is read out from the bank according to the second instruction at the execute timing of the first instruction.

BRIEF DESCRIPTION OF THE DRAWINGS

The above and other features and advantages of the present invention will become more apparent by describing in detail exemplary embodiments thereof with reference to the attached drawings in which:

FIG. 2 is a reference view for explaining a pre-fetch operation according to the present invention;

FIGS. 3A to 3C are reference views for explaining various operation modes of a PFU according to the present invention;

FIG. 4 is a view showing an example of the PFT according to the present invention;

FIG. 5 is a view for explaining a principle of adjusting access instructions shown in FIG. 4 that are predicted to cause bank the conflict in the PFT so as for the access instructions not to cause the bank conflict.

FIG. 6 is a view showing a mask table corresponding to the PFT shown in FIG. 4.

FIG. 7 is a view for explaining a principle of adjusting the access instructions shown in FIG. 4 that are predicted to cause the bank conflict in the mask table so as for the access instructions not to cause the bank conflict.

FIGS. 8A to 15C are detailed reference views showing a principle of avoiding bank conflict according to the present invention.

DETAILED DESCRIPTION OF THE INVENTION

The attached drawings for illustrating exemplary embodiments of the present invention are referred to in order to gain a sufficient understanding of the present invention, the merits thereof, and the objectives accomplished by the implementation of the present invention.

Hereinafter, an apparatus and method of avoiding bank conflict will be described with reference to the accompanying drawings.

Figure 1A:
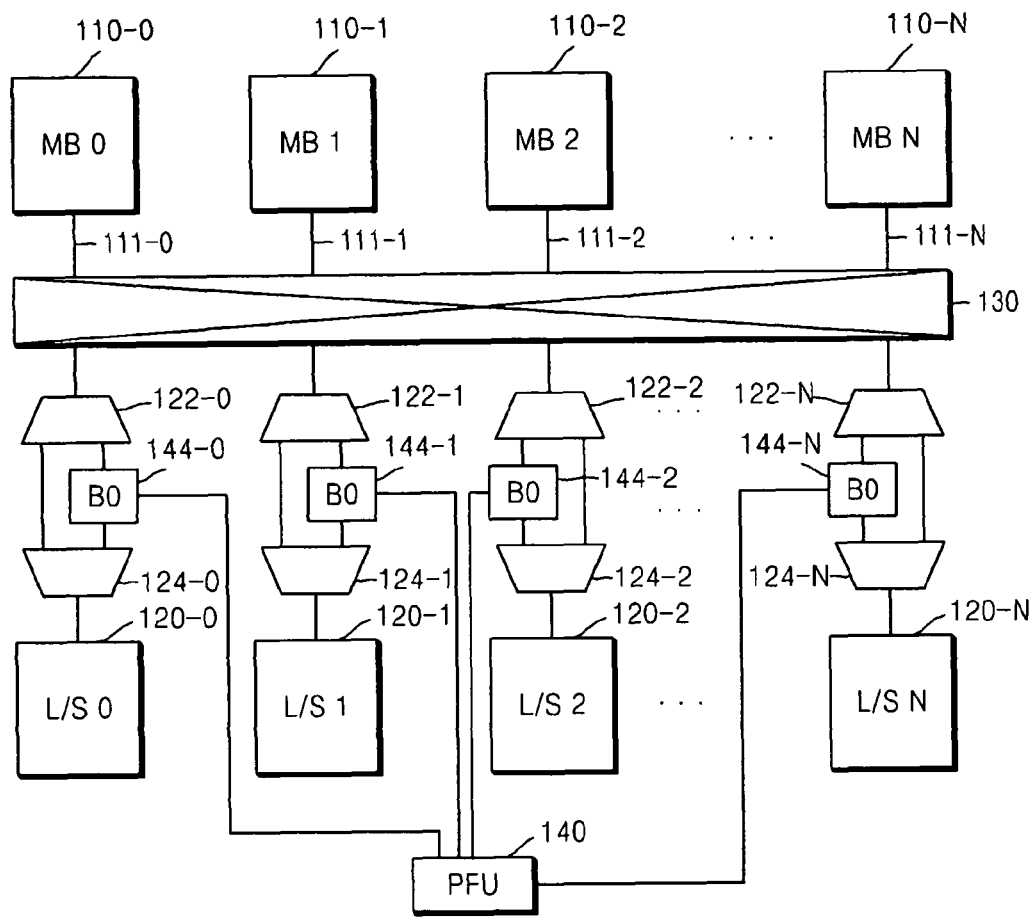
FIG. 1A is a circuit diagram for explaining an apparatus for avoiding bank conflict according to the present invention.
Figure 1B:
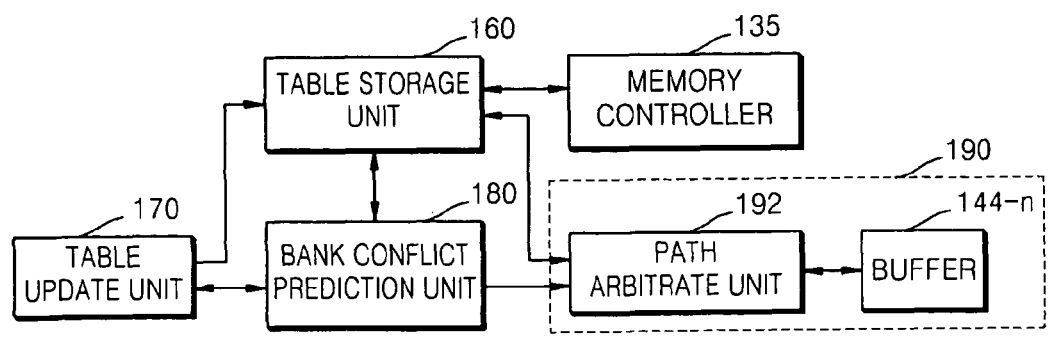
FIG. 1B is a block diagram for explaining the apparatus for avoiding bank conflict according to the present invention.

FIG. 1A is a circuit diagram for explaining an apparatus for avoiding bank conflict according to the present invention. FIG. 1B is a block diagram for explaining the apparatus for avoiding bank conflict according to the present invention. Referring to FIGS. 1A and 1B, the apparatus for avoiding bank conflict according to the present invention includes one or more banks MB0, MB1, MB2, . . . , and MBM (110-0, 110-1, 110-2, . . . , and 110-M) (M is a non-negative integer), a processor including a plurality of load/store units L/S0, L/S1, L/S2, . . . , and L/SN (120-0, 120-1, 120-2, . . . , and 120-N) (N is a natural number), multiplexer/demultiplexers (MUX/DEMUXs) 122-0, 122-1, 122-2, . . . , and 122-N, DEMUX/MUXs 124-0, 124-1, 124-2, . . . , and 124-N, a bus 130, a memory controller 135, a pre-fetching unit (PFU) 140, and buffers B0, B1, B2, . . . , and BN (144-0, 144-1, 144-2, . . . , and 144-N). Hereinafter, for the convenience of description, M is assumed to be N. That is, it is assumed that there are one-to-one correspondence among the banks 110-0, 110-1, 110-2, . . . , and 110-N, the load/store units 120-0, 120-1, 120-2, . . . , and 120-N, the MUX/DEMUXs 122-0, 122-1, 122-2, . . . , and 122-N, the DEMUX/MUXs 124-0, 124-1, 124-2, . . . , and 124-N, and the buffers 144-0, 144-1, 144-2, . . . , and 144-N.

The bank 110-n (n is a non-negative integer satisfying n≦N) denotes a logical unit of a memory. That is, addresses of the memory are independently allocated to the banks 110-n. In FIG. 1A, reference numerals 111-0, 111-1, 111-2, . . . , and 111-N denote output ports of the banks 110-0, 110-1, 110-2, . . . , and 110-N. That is, each of the banks 110-0, 110-1, 110-2, . . . , and 110-N is a single-port bank. More specifically, each bank 110-n has the only one path for receiving/transmitting information from/to an exterior of the bank 110-n.

Each load/store unit 120-n can access one of the banks 110-0, 110-1, 110-2, . . . , and 110-N. More specifically, each load/store unit 110-n may access one of the banks 110-0, 110-1, 110-2, . . . , and 110-N to read out a data from the bank. In addition, each load/store unit 110-n may access one of the banks 110-0, 110-1, 110-2, . . . , and 110-N to write a data in the bank.

As described above, since each of the banks 110-0, 110-1, 110-2, . . . , and 110-N is a single-port bank, each bank 110-n can be accessed by the only one of the load/store units 120-0, 120-1, 120-2, . . . , and 120-N.

Each of the MUX/DEMUXs 122-0, 122-1, 122-2, . . . , and 122-N serves as a MUX or a DEMUX or denotes a block which bypasses and outputs input information. Each of the DEMUX/MUXs 124-0, 124-1, 124-2, . . . , and 124-N serves as a DEMUX or a MUX or denotes a block which bypasses and outputs input information.

The bus 130 may connect each of the MUX/DEMUXs 122-0, 122-1, 122-2, . . . , and 122-N to one of the banks 110-0, 110-1, 110-2, . . . , and 110-N, or it may not connect each of the MUX/DEMUXs 122-n to any one of the banks 110-0, 110-1, 110-2, . . . , and 110-N. The MUX/DEMUXs 122-n, the DEMUX/MUXs 124-n, and the load/store units 120-n are connected to each other. As a result, the bus 130 may connect each of the load/store units 120-0, 120-1, 120-2, . . . , and 120-N to a specific one of the banks 110-0, 110-1, 110-2, . . . , and 110-N, or it may not connect each of the load/store units 110-n to any one of the banks 110-0, 110-1, 110-2, . . . , and 110-N. Each of the load/store units 120-n accesses a bank connected via the bus 130 among the banks 110-0, 110-1, 110-2, . . . , and 110-N.

If the bus 130 does not connect the load/store units 120-n to any one of the banks 110-0, 110-1, 110-2, . . . , and 110-N, the memory controller 135 controls to determine which one of the banks 110-0, 110-1, 110-2, . . . , and 110-N the load/store units 120-n are connected to.

More specifically, the memory controller 135 updates a connection state of the bus 130 to the banks 110-0, 110-1, 110-2, . . . , and 110-N and the load/store units 120-0, 120-1, 120-2, . . . , and 120-N according to the access instructions every time when the processor cycle of the processor is changed. The access instructions are allocated to the load/store units 120-0, 120-1, 120-2, . . . , and 120-N in the apparatus for avoiding bank conflict according to the present invention every time when the processor cycle of the processor is changed. The access instructions for the load/store units 120-n denote instructions that instruct the load/store units 120-n not to access any one of the banks 110-0, 110-1, 110-2, . . . , and 110-N or instruct the load/store units 120-n to access a specific one of the banks 110-0, 110-1, 110-2, . . . , and 110-N. The processor cycle denotes a clock cycle of a clock provided to the processor.

More specifically, a fetch/decode unit (not shown) provided to the apparatus for avoiding bank conflict according to the present invention fetches access instructions (which are prepared in advance as encoded access instructions in an external site outside the apparatus for avoiding bank conflict) as the access instructions for the load/store units 120-0, 120-1, 120-2, . . . , and 120-N every time when the processor cycle of the processor provided to the apparatus for avoiding bank conflict is changed. The fetch/decode unit decodes the fetched access instructions every time when the processor cycle of the processor is changed, and then, transmits the decoded access instructions to the later-described PFU 140. The PFU 140 adjusts the transmitted access instructions suitably during predetermined processor cycles of the processor. When the transmitted access instructions are suitably adjusted, the PFU 140 transmits the adjusted access instructions to the memory controller 135 just after the predetermined processor cycles elapse. If the transmitted access instructions are not suitably adjusted, the PFU 140 transmits the transmitted access instructions to the memory controller 135 just after the predetermined process cycles elapse. Here, the phrase "to adjust the transmitted access instructions suitably" denotes operations of the later-described scheduling unit (not shown) of the PFU 140 with respect to the transmitted access instructions.

The PFU 140 includes a scheduling unit (not shown) and a switching unit 190.

The scheduling unit determines whether or not access instructions that instruct at least two of the load/store units 120-0, 120-1, 120-2, . . . , and 120-N to access the same bank 110-n exist in the access instructions allocated to the apparatus for avoiding bank conflict according to the present invention. Here, the phrase "the access instructions allocated to the apparatus for avoiding bank conflict according to the present invention" denotes the access instructions for the load/store units 120-0, 120-1, 120-2, . . . , and 120-N that are updated every time when the process cycle of the processor is changed and decoded by the fetch/decode unit.

If it is determined that the access instruction that instructs at least a portion of the load/store units 120-0, 120-1, 120-2, . . . , and 120-N to access the same bank 120-n exist in the access instructions allocated to the apparatus for avoiding bank conflict according to the present invention, the scheduling unit replaces a first instruction (that is one of the access instructions that instruct at least a portion of the load/store units to access the same bank) with a second instruction by changing an execute timing of the first instruction to a timing prior to the execute timing of the first instruction so as for the access instructions (that instruct at least a portion of the load/store units to access the same bank) not to instruct at least a portion of the load/store units to access the same bank.

That is, if it is determined that there is an access instruction that is predicted to cause bank conflict among the access instructions allocated to the apparatus for avoiding bank conflict according to the present invention, the scheduling unit replaces the first instruction (that is one of the access instructions that are predicted to cause the bank conflict) with the second instruction by changing the execute timing of the first instruction to a timing prior to the execute timing of the first instruction so as for the access instruction (that is predicted to cause the bank conflict) not to cause the bank conflict.

The first and second instructions are different in terms of only the execute timings. More specifically, the instruction contents of the first and second instructions are the same, but the execute timing of the second instruction is prior to the execute timing of the first instruction. In the specification of the present invention, the first and second instructions are the access instructions that instruct the load/store units to perform read operations. That is, the first and second instructions are the access instructions that instruct the load/store unit to access one of the banks and read out a data from the bank. On the contrary, the access instructions excluding the first instruction among the access instructions for the load/store units 120-0, 120-1, 120-2, . . . , and 120-N that are decoded by the fetch/decode unit may include the access instructions that instruct the load/store units to perform write operations. That is, the access instructions excluding the first instruction among the access instructions for the load/store units 120-0, 120-1, 120-2, . . . , and 120-N that are decoded by the fetch/decode unit may include the access instructions that instruct the load/store unit to access one of the banks and write a data to the bank.

The scheduling unit (not shown) includes a table storage unit 160, a table update unit 170, and a bank conflict prediction unit 180. Now, operations of the scheduling unit will be described in detail.

The table storage unit 160 stores a pre-fetch table (PFT) listing the access instructions that are not executed among the access instructions decoded by the fetch/decode unit.

In addition to the PFT, the table storage unit 160 also stores a mask table (masked PFT) corresponding to the PFT. The mask table denotes a table obtained by updating the access instruction for the one load/store unit and one bank listed in the PFT considering at least a portion of the access instructions excluding the access instruction for the one load/store unit and one bank listed in the PFT.

Every time when the processor cycle of the processor is changed, the fetch/decode unit decodes the access instructions having a decoding timing corresponding to the changed process cycle among the access instructions allocated to the apparatus for avoiding the bank conflict according to the present invention. In addition, every time when the processor cycle of the processor is changed, the load/store units 120-0, 120-1, 120-2, . . . , and 120-N execute the access instructions having the execute timing corresponding to the changed process cycle among the access instructions allocated to the apparatus for avoiding the bank conflict according to the present invention.

Accordingly, every time when the processor cycle of the processor is changed, the table update unit 170 updates the PFT and the mask table stored in the table storage unit 160.

The bank conflict prediction unit 180 reads out the PFT from the table update unit 170 and determines based on the read PFT whether or not access instructions that instruct at least two of the load/store units 120-0, 120-1, 120-2, . . . , and 120-N to access the same bank 110-n exist in the access instructions allocated to the apparatus for avoiding bank conflict according to the present invention. Here, the phrase "the access instructions allocated to the apparatus for avoiding bank conflict according to the present invention" denotes the access instructions for the load/store units 120-0, 120-1, 120-2, . . . , and 120-N that are updated every time when the process cycle of the processor is changed and decoded by the fetch/decode unit.

In this case, in response to a result of the determination of the bank conflict prediction unit 180, the table update unit 170 updates the stored PFT by replacing the first instruction listed in the PFT stored in the table storage unit 160 with the second instruction. More specifically, if the bank conflict prediction unit 180 determines that the access instruction that instructs at least a portion of the load/store units 120-0, 120-1, 120-2, . . . , and 120-N to access the same bank 120-n exist in the access instructions allocated to the apparatus for avoiding bank conflict according to the present invention, the table update unit 170 updates the stored PFT by replacing the first instruction listed in the PFT stored in the table storage unit 160 with the second instruction. The updated PFT shows how the first instruction was existed on the PFT.

In addition, in response to a result of the determination of the bank conflict prediction unit 180, the table update unit 170 may update the stored mask table by replacing the first instruction listed in the mask table stored in the table storage unit 160 with the second instruction. More specifically, if the bank conflict prediction unit 180 determines that the access instruction that instructs at least a portion of the load/store units 120-0, 120-1, 120-2, . . . , and 120-N to access the same bank 120-n exist in the access instructions allocated to the apparatus for avoiding bank conflict according to the present invention, the table update unit 170 updates the stored mask table by replacing the first instruction listed in the mask table stored in the table storage unit 160 with the second instruction. The updated mask table shows how the first instruction was existed on the mask table. In this manner, if the table update unit 170 updates the mask table stored in the table storage unit 160 in response to a result of the determination of the bank conflict prediction unit 180, the table update unit 170 may also update the PFT stored in the table storage unit 160 by using a principle of updating the mask table.

After the load/store unit that is scheduled to access a bank according to the first instruction before the replacement of the first instruction with the second instruction accesses the bank at the execute timing of the second instruction to read a data from the bank, the switching unit 190 allows the load/store unit to be inputted the read data at the execute timing of the first instruction. More specifically, it is preferable that, in response to a result of the determination of the bank conflict prediction unit 180, the switching unit 190 performs operations with reference to the PFT updated by the table update unit 170.

The switching unit 190 includes a path arbitration unit 192 and buffers 144-0, 144-1, 144-2, . . . , and 144-N. Now, operations of the switching unit 190 will be described in detail.

The path arbitration unit 192 allows the load/store unit 120-n that is scheduled to access a bank according to the first instruction before the replacement of the first instruction with the second instruction to access the bank at the execute timing of the second instruction and read out a data from the bank.

In this case, the load/store unit 120-n that is scheduled to access a bank according to the first instruction before the replacement of the first instruction with the second instruction accesses the bank and reads out the data from the bank according to the second instruction. The buffer 144-n corresponding to the load/store unit 120-n that is scheduled to access a bank according to the first instruction before the replacement of the first instruction with the second instruction temporarily stores the read data.

After that, when the processor cycle of the processor becomes the execute timing of the first instruction after an elapse of a time difference between the execute timing of the first instruction and the execution time of the second instruction, the path arbitration unit 192 allows the load/store unit 120-n that is scheduled to access a bank according to the first instruction before the replacement of the first instruction with the second instruction to read out the data stored in the buffer 144-n from the buffer 144-n at the execute timing of the first instruction.

FIG. 2 is a reference view for explaining a pre-fetch operation according to the present invention. In FIG. 2, reference numerals i (i is a natural number), i+1, i+2, i+3, . . . , and i+11 denote processor cycles.

As shown in FIG. 2, every time when the processor cycle of the processor is changed, new instructions regarding the load/store units 120-0, 120-1, 120-2, . . . , and 120-N are input to the apparatus for avoiding bank conflict according to the present invention. That is, when the processor cycle of the processor is an i-th processor cycle, a a-th (a is a natural number) access instruction 210 is input to a fetch/decode unit (not shown); when the processor cycle of the processor is an (i+1)-th processor cycle, an (a+1)-th access instruction 220 is input to the fetch/decode unit ; when the processor cycle of the processor is an (i+2)-th processor cycle, an (a+2)-th access instruction 230 is input to the fetch/decode unit; when the processor cycle of the processor is an (i+3)-th processor cycle, an (a+3)-th access instruction 240 is input to the fetch/decode unit; and when the processor cycle of the processor is an (i+4)-th processor cycle, an (a+4)-th access instruction 250 is input to the fetch/decode unit.

The access instructions are subsequently subject to the fetch operation, a decode operation, a pre-fetch operation, an execute operation, and a write-back operation. The fetch operation is an operation where the fetch/decode unit fetches the access instruction. The decode operation is an operation where the fetch/decode unit decodes the fetched access instruction. The pre-fetch operation is an operation where the scheduling unit adjusts the decoded access instruction suitably (for example, to replace the first instruction with the second instruction). The execute operation is an operation where the access instruction is executed. The write-back operation is an operation where a data obtained by the execution of the access instruction (for example, a data read out from a bank) is written in the bank. The write-back operation may be omitted. In FIG. 2, F, D, PF, E, and WB denote the fetch operation, the decode operation, the pre-fetch operation, the execute operation, and the write-back operation.

The access instructions according to the present invention are allocated with a fetch timing, a decode timing, a pre-fetch timing, an execute timing, and a write-back timing. If an access instruction is not subject to the write-back operation, the access instruction is not allocated with the write-back timing. The fetch timing denotes a timing when the fetch operation is performed. The decode timing denotes a timing when the decode operation is performed. The pre-fetch timing denotes a timing when the pre-fetch operation is performed. The execute timing denotes a timing when the execute operation is performed. The write-back timing denotes a timing when the write-back operation is performed. For example, the fetch timing for the a-th access instruction 210 is a timing when the processor cycle is the i-th processor cycle. The fetch timing for the (a+1)-th access instruction 220 is a timing when the processor cycle is the (i+1)-th processor cycle. The fetch timing for the (a+2)-th access instruction 230 is a timing when the processor cycle is the (i+2)-th processor cycle. The fetch timing for the (a+3)-th access instruction 240 is a timing when the processor cycle is the (i+3)-th processor cycle. The fetch timing for the (a+4)-th access instruction 250 is a timing when the processor cycle is the (i+4)-th processor cycle.

As shown in FIG. 2, each of the fetch operation, the decode operation, the execute operation, and the write-back operation is performed for one processor cycle, but the pre-fetch operation is performed for five processor cycles. The time intervals when the fetch operation, the decode operation, the pre-fetch operation, the execute operation, and the write-back operation are performed are selected for the convenience of description, but the present invention is not limited thereto.

FIGS. 3A to 3C are reference views for explaining various operation modes of the PFU 140 according to the present invention.

FIG. 3A shows a case where the PFU 140 operates in a bypass mode. Specifically, if an access instruction allocated to the load/store unit 120-n is not one of the access instructions that are predicted to cause the bank conflict, the PFU 140 operates in the bypass mode with respect to the load/store 120-n. More specifically, if the access instruction allocated to the load/store unit 120-n is an access instruction that instructs the load/store unit 120-n to read out a data from the bank 110-n but not one of the access instructions that are predicted to cause the bank conflict, the PFU 140 allows the load/store unit 120-n to access the bank 110-n and read out the data from the bank 110-n at the execute timing of the access instruction.

FIG. 3B shows a case where the PFU 140 operates in a pre-fetch mode. Specifically, if the access instruction allocated to the load/store unit 120-n is one of the access instructions that are predicted to cause the bank conflict, the PFU 140 operates in the pre-fetch mode with respect to the load/store 120-n. More specifically, if the access instruction allocated to the load/store unit 120-n is the first instruction (that is, the access instruction that instructs the load/store unit 120-n to read out a data from the bank 110-n as well as one of the access instructions that are predicted to cause the bank conflict), the PFU 140 allows the load/store unit 120-n to access the bank 110-n and read out the data from the bank 110-n at the execute timing of the second instruction. In this case, the load/store units 120-n accesses the bank 110-n and reads out the data from the bank 110-n at the execute timing of the second instruction, and the buffer 144-n temporarily stores the read data.

FIG. 3C shows a case where the PFU 140 operates in a block/dispatch mode. Specifically, if the load/store unit 120-n previously operates in the pre-fetch mode, when a predetermined time elapses after the operation in the pre-fetch mode is completed, the PFU 140 operates in the block/dispatch mode with respect to the load/store 120-n. More specifically, if the load/store unit 120-n previously accesses the bank 110-n and reads out the data from the bank 110-n at the execute timing of the second instruction and if the buffer 114-n temporarily stores the read data, the PFU 140 blocks the load/store unit 120-n from accessing the bank 110-n at the execute timing of the first instruction and allows the load/store unit 120-n to be inputted the data stored in the buffer 144-n at the execute timing of the first instruction. Accordingly, the load/store unit 120-n receives the data stored in the buffer 144-n at the execute timing of the first instruction. That is, the data stored in the buffer 144-n is dispatched to the load/store unit 120-n at the execute timing of the first instruction.

FIG. 4 is a view showing an example of the PFT 400 according to the present invention in case of M=N=4.

As shown in FIG. 4, each of seventeen b-th (b is a natural number) access instructions 410 is an access instruction when the decode timing is the i-th processor cycle. Each of seventeen (b+1)-th access instructions 420 is an access instruction when the decode timing is the (i+1)-th processor cycle. Each of seventeen (b+2)-th access instructions 430 is an access instruction when the decode timing is the (i+2)-th processor cycle. Each of seventeen (b+3)-th access instructions 440 is an access instruction when the decode timing is the (i+3)-th processor cycle. That is, when the processor cycle of the processor is the i-th cycle, the fetch/decode unit decodes the b-th access instructions 410. When the processor cycle of the processor is the (i+1)-th cycle, the fetch/decode unit decodes the (b+1)-th access instructions 420. When the processor cycle of the processor is the (i+2)-th cycle, the fetch/decode unit decodes the (b+2)-th access instructions 430. When the processor cycle of the processor is the (i+3)-th cycle, the fetch/decode unit decodes the (b+3)-th access instructions 440.

In FIG. 4, the PFT 400 shows that the b-th access instructions 410, the (b+1)-th access instructions 420, the (b+2)-th access instructions 430, and (b+3)-th access instructions 440 are not executed.

In FIG. 4, L0, L1, L2, and L3 denote L/S0 120-0, L/S1 120-1, L/S2 120-2, and L/S3 120-3, respectively.

In FIG. 4, each numeral 1 or 0 denotes an access instruction. More specifically, the numeral 1 for the load/store unit 120-p(p is an integer satisfying 1≦p≦4) and the bank 110-q (q is an integer satisfying 1≦q≦4) denotes the access instruction for the load/store unit 120-p that instructs the load/store unit 120-p to access the bank 110-q. The numeral 1 may denote the access instruction that instructs the load/store unit 120-p to access the bank 110-q and read out a data from the bank 110-q or the access instruction that instructs the load/store unit 120-p to access the bank 110-q and write a data in the bank 110-q. The numeral 0 for the load/store unit 120-p and the bank 110-q denotes the access instruction for the load/store unit 120-p that instructs the load/store unit 120-p not to access the bank 110-q.

Referring to FIG. 4, the access instructions that are predicted to cause the bank conflict do not exist in the b-th access instructions 410. On the other hand, the access instructions that are predicted to cause the bank conflict exist in the (b+1)-th access instructions 420. That is, among the (b+1)-th access instructions 420, the access instruction that instructs the load/store unit 120-1 to access the bank 110-0 and the access instruction that instructs the load/store unit 120-2 to access the bank 110-0 are predicted to cause the bank conflict in the bank 110-0 at the execute timing of the (b+1)-th access instructions 420. Similarly, the access instructions that are predicted to cause the bank conflict also exist in the (b+2)-th access instructions 430. That is, among the (b+2)-th access instructions 430, the access instruction that instructs the load/store unit 120-1 to access the bank 110-2 and the access instruction that instructs the load/store unit 120-3 to access the bank 110-2 are predicted to cause the bank conflict in the bank 110-2 at the execute timing of the (b+2)-th access instructions 430. In addition, the access instructions that are predicted to cause the bank conflict also exist in the (b+3)-th access instructions 440. That is, among the (b+3)-th access instructions 440, the access instruction that instructs the load/store unit 120-0 to access the bank 110-3 and the access instruction that instructs the load/store unit 120-2 to access the bank 110-3 are predicted to cause the bank conflict in the bank 110-3 at the execute timing of the (b+3)-th access instructions 440.

FIG. 5 is a view for explaining a principle of adjusting the access instructions shown in FIG. 4 that are predicted to cause the bank conflict in the PFT 400 so as for the access instructions not to cause the bank conflict. More specifically, the PFT 500 shown in FIG. 5 is a PFT obtained by updating the PFT 400 shown in FIG. 4 by the table update unit 170.

In FIG. 5, arrows indicate processes for replacing the first instructions with the second instructions. Specifically, an end point P of each arrow indicates the second instruction, and a start port D thereof indicates the first instruction that is to be replaced with the second instruction. More specifically, the indicator P for the load/store unit 120-k and the bank 110-q indicates the access instruction for the load/store unit 120-p that instructs the load/store unit 120-p to access the bank 110-q. The indicator D for the load/store unit 120-p and the bank 110-q indicates the access instruction for the load/store unit 120-p that instructs the load/store unit 120-p not to access the bank 110-q. However, the indicator P is not represented with the numeral 1, and the indicator D is not represented with the numeral 0 due to the following reasons. The indicator P and the numeral 1 are not equal to each other in the strict meaning in that the access instruction represented by the indicator P for the load/store unit 120-k and the bank 110-q are the access instruction that allows the memory controller 135 to instruct the load/store unit 120-k to access the bank 110-q and allows the PFU 140 to intercept the data that the load/store unit 120-k accesses the bank 110-q to read out from the bank 110-q and transfers to the buffer 144-4 and to instruct the buffer 144-k to store the transferred data. Similarly, the indicator D and the numeral 0 are not equal to each other in the strict meaning in that the access instruction represented by the indicator D for the load/store unit 120-k and the bank 110-q are the access instruction that allows the memory controller 135 to instruct the load/store unit 120-k not to access the bank 110-q and allows the PFU 140 to block the load/store unit 120-k from accessing the bank 110-q and to instruct the load/store unit 120-k to receive the data from the buffer 144-k.

In the only case where (i) the numeral 0 exists among the numerals existing in the upper direction in the PFT 400 or 500 with respect to the numeral 1 representing the first instruction in the PFT 400 and (ii) the access instructions that are predicted to cause the bank conflict do not occur additionally although the numeral 1 representing the first instruction in the PFT 400 is replaced with the numeral 0 existing in the upper direction, the table update unit 170 updates the PFT 400 with the PFT 500 by replacing the numeral 1 representing the first instruction in the PFT 400 with the indicator D and replacing the numeral 0 existing in the upper direction with the indicator P.

Therefore, the table update unit 170 can update the PFT 400 so that the access instructions that are predicted to cause the bank conflict do not exist in the (b+2)-th access instructions 430 as well as the (b+3)-th access instructions 440. However, if the (b+1)-th access instruction (represented by the numeral 1) that instructs the load/store unit 120-2 to access the bank 110-0 listed in PFT 400 is replaced with the b-th access instruction (represented by the indicator P) that instructs the load/store unit 120-2 to access the bank 110-0, or if the (b+1)-th access instruction (represented by the numeral 1) that instructs the load/store unit 120-1 to access the bank 110-0 listed in the PFT 400 is replaced with the b-th access instruction (represented by the indicator P) that instructs the load/store unit 120-1 to access the bank 110-0, the b-th access instructions 410 causes the bank conflict in the bank 110-0 that is not predicted to cause the bank conflict previously so that the table update unit 170 cannot allow the access instructions that are predicted to cause the bank conflict not to exist in the (b+1)-th access instructions 420.

FIG. 6 is a view showing a mask table 600 corresponding to the PFT 400 shown in FIG. 4.

As described above, the mask table 600 denotes a table obtained by updating the access instruction for the one load/store unit and one bank listed in the PFT 400 considering at least a portion of the access instructions excluding the access instruction for the one load/store unit and one bank listed in the PFT.

Specifically, in a case where at least one numeral 1 exists in the access instruction for the one bank and all the load/store units in the PFT 400, the mask table 600 is a table obtained by updating all the access instructions with the numeral 1. For example, the access instructions for the bank 110-0 and the load/store units 120-0, 120-1, 120-2, and 120-3 are 1, 0, 0, and 0 in the PFT 400, but the access instruction for the bank 110-0 and the load/store units 120-0, 120-1, 120-2, and 120-3 are 1, 1, 1, and 1 in the mask table 600.

In addition, in a case where only the numeral 0 exists in the access instructions for the one bank and all the load/store units in the PFT 400, the mask table 600 is a table obtained by performing Logical OR on the access instructions for the bank 110-0 and the load/store units 120-0, 120-1, 120-2, and 120-3, the access instructions for the bank 110-1 and the load/store units 120-0, 120-1, 120-2, and 120-3, the access instructions for the bank 110-2 and the load/store units 120-0, 120-1, 120-2, and 120-3, and the access instructions for the bank 110-3 and the load/store units 120-0, 120-1, 120-2, and 120-3. For example, the access instructions for the bank 110-3 and the load/store units 120-0, 120-1, 120-2, and 120-3 are 0, 0, 0, and 0 in the PFT 400, but the access instructions for the bank 110-3 and the load/store units 120-0, 120-1, 120-2, and 120-3 are 1, 1, 1, and 0 in the mask table 600. The first numeral 1 in 1, 1, 1, and 0 is a result of Logical OR of 1, 0, 0, and 0. The second numeral 1 is a result of Logical OR of 0, 1, 0, and 0. The third numeral 1 is a result of Logical OR of 0, 0, 1, and 0. The fourth numeral 1 is a result of Logical OR of 0, 0, 0, and 0.

Accordingly, the b-th access instruction 410, the (b+1)-th access instruction 420, the (b+2)-th access instruction 430, and the (b+3)-th access instruction 440 in the PFT 400 are updated with the b-th access instruction 610, the (b+1)-th access instruction 620, the (b+2)-th access instruction 630, and the (b+3)-th access instruction 640 in the mask table, respectively.

FIG. 7 is a view for explaining a principle of adjusting the access instructions shown in FIG. 4 that are predicted to cause the bank conflict in the mask table so as for the access instructions not to cause the bank conflict. More specifically, the mask table 700 shown in FIG. 7 is a mask table obtained by updating the mask table 600 shown in FIG. 6 by the table update unit 170.

In FIG. 7, arrows indicate processes for replacing the first instructions with the second instructions. More specifically, the indicators P and D shown in FIG. 7 are the same as the indicators P and D shown in FIG. 5.

In the only case where the numeral 0 exists among the numerals existing in the upper direction in the mask table 600 or 700 with respect to the numeral 1 representing the first instruction in the mask table 600, the table update unit 170 updates the mask table 600 with the mask table 700 by replacing the numeral 1 representing the first instruction in the mask table 600 with the indicator D and replacing the numeral 0 existing in the upper direction with the indicator P. As a result, the updating of the mask table 600 with the mask table 700 can be completed more rapidly that the updating of the PFT 400 with the PFT 500. Accordingly, the operation of replacing the first instruction with the second instruction so as for the access instructions that are predicted to cause the bank conflict not to cause the bank conflict is performed by using the mask table 600 instead of the PFT 400, so that the operation of replacing can be completed more rapidly.

Therefore, the table update unit 170 can update the mask table 600 so that the access instructions that are predicted to cause the bank conflict do not exist in the (b+2)-th access instructions 630 as well as the (b+3)-th access instructions 640. However, the table update unit 170 cannot allow the access instructions that are predicted to cause the bank conflict not to exist in the (b+1)-th access instructions 620.

In addition, although the PFT 400 is not updated with the PFT 500 at the time when the table update unit 170 updates the mask table 600 with the mask table 700, the table update unit 170 can update the PFT 400 with the PFT 500 by using the principle of updating the mask table 600 with the mask table 700.

FIGS. 8A to 15C are detailed reference views showing a principle of avoiding bank conflict according to the present invention.

As shown in FIGS. 8A to 15C, M=N=4, and L0, L1, L2, and L3 denote L/S0 120-0, L/S1 120-1, L/S2 120-2, and L/S3 120-3, respectively.

As shown in FIGS. 8A to 15C, c-th (c is a natural number) access instructions 800, (c+1)-th access instructions 802 or 804, (c+2)-th access instructions 812 or 814, (c+3)-th access instructions 822 or 824, (c+4)-th access instructions 832 or 834, (c+5)-th access instructions 842 or 844, (c+6)-th access instructions 852 or 854, (c+7)-th access instructions 862 or 864, (c+8)-th access instructions 872 or 874, (c+9)-th access instructions 882 or 884, (c+10)-th access instructions 892 or 894, and (c+11)-th access instructions 896) denote access instructions decoded when the processor cycle is an i-th processor cycle, access instructions decoded when the processor cycle is an (i+1)-th processor cycle, access instructions decoded when the processor cycle is an (i+2)-th processor cycle, access instructions decoded when the processor cycle is an (i+3)-th processor cycle, access instructions decoded when the processor cycle is an (i+4)-th processor cycle, access instructions decoded when the processor cycle is an (i+5)-th processor cycle, access instructions decoded when the processor cycle is an (i+6)-th processor cycle, access instructions decoded when the processor cycle is an (i+7)-th processor cycle, access instructions decoded when the processor cycle is an (i+8)-th processor cycle, access instructions decoded when the processor cycle is an (i+9)-th processor cycle, access instructions decoded when the processor cycle is an (i+10)-th processor cycle, and access instructions decoded when the processor cycle is an (i+11)-th processor cycle, respectively.

As shown in FIGS. 8A to 15C, each of the fetch operation, the decode operation, the execute operation, and the write-back operation on the (c+d)-th (d is an integer satisfying $0 \leq d \leq 11$) access instruction is performed for one processor cycle, but the pre-fetch operation on the (c+d)-th access instruction is performed for three processor cycle. That is, the fetch operation on the (c+d)-th access instruction is performed when the processor cycle is the j-th (j is a natural number) processor cycle. The decode operation on the (c+d)-th access instruction is performed when the processor cycle is the (j+1)-th processor cycle. The pre-fetch operation on the (c+d)-th access instruction is performed from the time when the processor cycle is the (j+2)-th processor cycle to the time when the processor cycle is the (j+4)-th processor cycle. The execute operation on the (c+d)-th access instruction is performed when the processor cycle is the (j+5)-th processor cycle. The write-back operation on the (c+d)-th access instruction is performed when the processor cycle is the (j+6)-th processor cycle.

FIGS. 8A to 8C show execution-proceeding access instructions, a PFT, and a mask table when the processor cycle of the processor is the (i+4)-th processor cycle.

More specifically, FIG. 8A is a view showing that the execution-proceeding access instructions are c-th access instructions 800 when the processor cycle of the processor is the (i+4)-th processor cycle.

FIG. 8B is a view showing the PFT listing (c+1)-th access instructions 802, (c+2)-th access instructions 812, (c+3)-th access instructions 822, and (c+4)-th access instructions 832 when the processor cycle of the processor is the (i+4)-th processor cycle.

FIG. 8C is a view showing the mask table listing (c+1)-th access instructions 804, (c+2)-th access instructions 814, and (c+3)-th access instructions 824 when the processor cycle of the processor is the (i+4)-th processor cycle. The (c+4)-th access instructions 832 shown in FIG. 8C are the same as (c+4)-th access instructions 832 shown in FIG. 8B.

In this case, when the process cycle of the processor becomes the (i+4)-th processor cycle, the bank conflict prediction unit 180 determines whether or not access instructions that are predicted to cause the bank conflict exist in the (c+3)-th access instructions 832. Referring to FIG. 8B, the access instructions that are predicted to cause the bank conflict do not exist in the (c+3)-th access instructions 832.

FIGS. 9A to 9C show the execution-proceeding access instructions, the PFT, and the mask table when the processor cycle of the processor is the (i+5)-th processor cycle. 25 More specifically, FIG. 9A is a view showing that the execution-proceeding access instructions are (c+1)-th access instructions 802 when the processor cycle of the processor is the (i+5)-th processor cycle.

FIG. 9B is a view showing the PFT listing (c+2)-th access instructions 812, (c+3)-th access instructions 822, (c+4)-th access instructions 832, and (c+5)-th 30 access instructions 842 when the processor cycle of the processor is the (i+5)-th processor cycle. When the processor cycle of the processor becomes the (i+5)-th processor cycle, the (c+1)-th access instructions 802 are executed, and the table update unit 170 updates the PFT shown in FIG. 8B that is stored in the table storage unit 160 with the PFT shown in FIG. 9B.

FIG. 9C is a view showing the mask table listing (c+2)-th access instructions 814, (c+3)-th access instructions 824, and (c+4)-th access instructions 834 when the processor cycle of the processor is the (i+5)-th processor cycle. The (c+5)-th access instructions 842 shown in FIG. 9C are the same as the (c+5)-th access instructions 842 shown in FIG. 9B.

In this case, when the process cycle of the processor becomes the (i+5)-th processor cycle, the bank conflict prediction unit 180 determines whether or not access instructions that are predicted to cause the bank conflict exist in the (c+5)-th access instructions 842. Referring to FIG. 9B, the access instructions (0, 1, 1, 0) that are predicted to cause the bank conflict exist in the (c+5)-th access instructions 842.

However, although the bank conflict prediction unit 180 predicts that the access instructions (0, 1, 1, 0) that are predicted to cause the bank conflict exist in the (c+5)-th access instructions 842, since the numeral 0 does not exist in the access instructions (1, 1, 1, 1) for the bank 110-0 among the (c+4)-th access instructions 834, the table update unit 170 cannot replace the first instruction existing in the (c+5)-th access instructions 842 with the second instruction. Therefore, the access instructions that are predicted to cause the bank conflict among the (c+5)-th access instructions 842 cannot be processed.

FIGS. 10A to 10D show execution-proceeding access instructions when the processor cycle of the processor is the (i+6)-th processor cycle, a PFT before the replacement of the first instruction with the second instruction, a mask table before the replacement of the first instruction with the second instruction, and a PFT after the replacement of the first instruction with the second instruction.

More specifically, FIG. 10A is a view showing that the execution-proceeding access instructions when the processor cycle of the processor is the (i+6)-th processor cycle are the (c+2)-th access instructions 812.

FIG. 10B is a view showing the PFT listing the (c+3)-th access instructions 822, the (c+4)-th access instructions 832, the (c+5)-th access instructions 842, and the (c+6)-th access instructions 852 when the processor cycle of the processor is the (i+6)-th processor cycle. When the processor cycle of the processor becomes the (i+6)-th processor cycle, the (c+2)-th access instructions 812 is executed, and the table update unit 170 updates the PFT shown in FIG. 9B that is stored in the table storage unit 160 with the PFT shown in FIG. 10B.

FIG. 10C is a view showing the mask table listing the (c+3)-th access instructions 824, the (c+4)-th access instructions 834, and the (c+5)-th access instructions 844 when the processor cycle of the processor is the (i+6)-th processor cycle. The (c+6)-th access instructions 852 shown in FIG. 10C are the same as the (c+6)-th access instructions 852 shown in FIG. 10B.

In this case, when the processor cycle of the processor becomes the (i+6)-th processor cycle, the bank conflict prediction unit 180 determines whether or not access instructions that are predicted to cause the bank conflict exist in the (c+6)-th access instructions 852. Referring to FIG. 10B, the access instructions 0, 1, 0, and 1 that are predicted to cause the bank conflict exist in the (c+6)-th access instructions 852.

If the bank conflict prediction unit 180 determines that the access instructions 0, 1, 0, and 1 that are predicted to cause the bank conflict exist in the (c+6)-th access instructions 852, since the numeral 0 exists in the upper direction in the mask table with respect to the (c+6)-th access instruction (represented by the numeral 1) for the load/store unit 120-3 and the bank 110-2, the table update unit 170 updates the PFT shown in FIG. 10B with the PFT shown in FIG. 10D by replacing the numeral 1 representing the (c+6)-th access instruction for the load/store unit 120-3 and the bank 110-2 among the (c+6)-th access instructions 852 with the indicator D, replacing the numeral 0 representing the (c+5)-th access instruction for the load/store unit 120-3 and the bank 110-2 among the (c+5)-th access instructions 844 with the indicator P, and replacing the numeral 0 representing the (c+5)-th access instruction for the load/store unit 120-3 and the bank 110-2 among the (c+5)-th access instructions 842 with the indicator P.

FIGS. 11A to 11D show execution-proceeding access instructions when the processor cycle of the processor is the (i+7)-th processor cycle, a PFT before the replacement of the first instruction with the second instruction, a mask table before the replacement of the first instruction with the second instruction, and a PFT after the replacement of the first instruction with the second instruction. 30 More specifically, FIG. 11A is a view showing that the execution-proceeding access instructions when the processor cycle of the processor is the (i+7)-th processor cycle are the (c+3)-th access instructions 822.

FIG. 11B is a view showing the PFT listing the (c+4)-th access instructions 832, the (c+5)-th access instructions 842, the (c+6)-th access instructions 852, and the (c+7)-th access instructions 862 when the processor cycle of the processor is the (i+7)-th processor cycle. When the processor cycle of the processor becomes the (i+7)-th processor cycle, the (c+3)-th access instructions 822 is executed, and the table update unit 170 updates the PFT shown in FIG. 10B that is stored in the table storage unit 160 with the PFT shown in FIG. 11B.

FIG. 11C is a view showing the mask table listing the (c+4)-th access instructions 834, the (c+5)-th access instructions 844, and the (c+6)-th access instructions 854 when the processor cycle of the processor is the (i+7)-th processor cycle. The (c+7)-th access instructions 862 shown in FIG. 11C are the same as the (c+7)-th access instructions 862 shown in FIG. 11B.

In this case, when the processor cycle of the processor becomes the (i+7)-th processor cycle, the bank conflict prediction unit 180 determines whether or not access instructions that are predicted to cause the bank conflict exist in the (c+7)-th access instructions 862. Referring to FIG. 11B, access instructions 1, 0, 1, and 1 that are predicted to cause the bank conflict exist in the (c+7)-th access instructions 862.

If the bank conflict prediction unit 180 determines that the access instructions 1, 0, 1, and 1 that are predicted to cause the bank conflict exist in the (c+7)-th access instructions 862, since the numeral 0 exists in the upper direction in the mask table with respect to the (c+7)-th access instruction (represented by the numeral 1) for the load/store unit 120-0 and the bank 110-3, the table update unit 170 updates the PFT shown in FIG. 11B with the PFT shown in FIG. 11D by replacing the numeral 1 representing the (c+7)-th access instruction for the load/store unit 120-0 and the bank 110-3 among the (c+7)-th access instructions 862 with the indicator D, replacing the numeral 0 representing the (c+5)-th access instruction for the load/store unit 120-0 and the bank 110-3 among the (c+5)-th access instructions 844 with the indicator P, and replacing the numeral 0 representing the (c+5)-th access instruction for the load/store unit 120-0 and the bank 110-3 among the (c+5)-th access instructions 842 with the indicator P.

FIGS. 12A to 12C show the execution-proceeding access instructions, the PFT, and the mask table when the processor cycle of the processor is the (i+8)-th processor cycle.

More specifically, FIG. 12A is a view showing that the execution-proceeding access instructions are the (c+4)-th access instructions 832 shown in FIG. 11D when the processor cycle of the processor is the (i+8)-th processor cycle.

FIG. 12B is a view showing the PFT listing (c+5)-th access instructions 842, (c+6)-th access instructions 852, (c+7)-th access instructions 862, and (c+8)-th access instructions 872 when the processor cycle of the processor is the (i+8)-th processor cycle. When the processor cycle of the processor becomes the (i+8)-th processor cycle, the (c+4)-th access instructions 832 are executed, and the table update unit 170 updates the PFT shown in FIG. 11B that is stored in the table storage unit 160 with the PFT shown in FIG. 12B.

FIG. 12C is a view showing the mask table listing (c+5)-th access instructions 844, (c+6)-th access instructions 854, and (c+7)-th access instructions 864 when the processor cycle of the processor is the (i+8)-th processor cycle. The (c+8)-th access instructions 872 shown in FIG. 12C are the same as the (c+8)-th access instructions 872 shown in FIG. 12B.

In this case, when the process cycle of the processor becomes the (i+8)-th processor cycle, the bank conflict prediction unit 180 determines whether or not access instructions that are predicted to cause the bank conflict exist in the (c+8)-th access instructions 872. Referring to FIG. 12B, the access instructions that are predicted to cause the bank conflict do not exist in the (c+8)-th access instructions 872.

FIGS. 13A to 13C show the execution-proceeding access instructions, the PFT, and the mask table when the processor cycle of the processor is the (i+9)-th processor cycle.

More specifically, FIG. 13A is a view showing that the execution-proceeding access instructions are (c+5)-th access instructions 842 when the processor cycle of the processor is the (i+9)-th processor cycle.

The (c+5)-th access instruction for the load/store unit 120-1 and the bank 110-0 and the (c+5)-th access instruction for the load/store unit 120-2 and the bank 110-0 causes the bank conflict in the bank 110-0 when the processor cycle of the processor is the (i+9)-th processor cycle. In this case, after the memory controller 135 adjusts states of all the load/store unit 120-1, the load/store unit 120-2, and the bank 110-0 considering the (c+5)-th access instruction for the load/store unit 120-1 and the bank 110-0 and the (c+5)-th access instruction for the load/store unit 120-2 and the bank 110-0, the processor cycle of the processor can be changed.

The memory controller 135 allows the load/store unit 120-3 to access the bank 110-2 and read out a data according to the (c+5)-th access instruction for the load/store unit 120-3 and the bank 110-2. The PFU 140 intercepts the data that the load/store unit 120-3 reads out, transfers the data to the buffer 144-3, and allows the buffer 144-3 to temporarily store the transferred data. Accordingly, the buffer 144-3 temporarily stores the read data.

The memory controller 135 allows the load/store unit 120-0 to access the bank 110-3 and read out a data according to the (c+5)-th access instruction for the load/store unit 120-0 and the bank 110-3. The PFU 140 intercepts the data that the load/store unit 120-0 reads out, transfers the data to the buffer 144-0, and allows the buffer 144-0 to temporarily store the transferred data. Accordingly, the buffer 144-0 temporarily stores the read data.

FIG. 13C is a view showing the PFT listing (c+6)-th access instructions 852, (c+7)-th access instructions 862, (c+8)-th access instructions 872, and (c+9)-th access instructions 882 when the processor cycle of the processor is the (i+9)-th processor cycle. When the processor cycle of the processor becomes the (i+9)-th processor cycle, the (c+5)-th access instructions 842 are executed, and the table update unit 170 updates the PFT shown in FIG. 12B that is stored in the table storage unit 160 with the PFT shown in FIG. 13B.

FIG. 13C is a view showing the mask table listing the (c+6)-th access instructions 854, the (c+7)-th access instructions 864, and the (c+8)-th access instructions 874 when the processor cycle of the processor is the (i+9)-th processor cycle. The (c+9)-th access instructions 882 shown in FIG. 13C are the same as the (c+9)-th access instructions 882 shown in FIG. 13B.

In this case, when the processor cycle of the processor becomes the (i+9)-th processor cycle, the bank conflict prediction unit 180 determines whether or not access instructions that are predicted to cause the bank conflict exist in the (c+9)-th access instructions 882. Referring to FIG. 13B, the access instructions that are predicted to cause the bank conflict do not exist in the (c+9)-th access instructions 882.

FIGS. 14A to 14C show the execution-proceeding access instructions, the PFT, and the mask table when the processor cycle of the processor is the (i+10)-th processor cycle.

More specifically, FIG. 14A is a view showing that the execution-proceeding access instructions are (c+6)-th access instructions 852 when the processor cycle of the processor is the (i+10)-th processor cycle.

The memory controller 135 allows the load/store unit 120-1 to access the bank 110-2 and read out a data according to the (c+6)-th access instruction for the load/store unit 120-1 and the bank 110-2. Accordingly, the load/store unit 120-1 reads out the data from the bank 110-2.

The memory controller 135 allows the load/store unit 120-2 to access the bank 110-3 and read out a data according to the (c+6)-th access instruction for the load/store unit 120-2 and the bank 110-3. The PFU 140 intercepts the data that the load/store unit 120-2 reads out, transfers the data to the buffer 144-2, and allows the buffer 144-2 to temporarily store the transferred data. Accordingly, the buffer 144-2 temporarily stores the read data.

The PFU 140 blocks the load/store unit 120-3 from accessing the bank 110-2 and controls the load/store unit 120-3 to read out a data (stored in the buffer 144-3) from the buffer 144-3 according to the (c+6)-th access instruction for the load/store unit 120-3 and the bank 110-2. Accordingly, the load/store unit 120-3 reads out the data from the buffer 144-3.

FIG. 14B is a view showing the PFT listing (c+7)-th access instructions 862, (c+8)-th access instructions 872, (c+9)-th access instructions 882, and (c+10)-th access instructions 892 when the processor cycle of the processor is the (i+10)-th processor cycle. When the processor cycle of the processor becomes the (i+10)-th processor cycle, the (c+6)-th access instructions 852 are executed, and the table update unit 170 updates the PFT shown in FIG. 13B that is stored in the table storage unit 160 with the PFT shown in FIG. 14B.

FIG. 14C is a view showing the mask table listing (c+7)-th access instructions 864, (c+8)-th access instructions 874, and (c+9)-th access instructions 884 when the processor cycle of the processor is the (i+10)-th processor cycle. The (c+10)-th access instructions 892 shown in FIG. 14C are the same as the (c+10)-th access instructions 892 shown in FIG. 14B.

In this case, when the process cycle of the processor becomes the (i+10)-th processor cycle, the bank conflict prediction unit 180 determines whether or not access instructions that are predicted to cause the bank conflict exist in the (c+10)-th access instructions 892. Referring to FIG. 14B, the access instructions that are predicted to cause the bank conflict do not exist in the (c+10)-th access instructions 892.

FIGS. 15A to 15C show the execution-proceeding access instructions, the PFT, and the mask table when the processor cycle of the processor is the (i+11)-th processor cycle.

More specifically, FIG. 15A is a view showing that the execution-proceeding access instructions are the (c+7)-th access instructions 862 shown in FIG. 14C when the processor cycle of the processor is the (i+11)-th processor cycle.

The memory controller 135 controls the load/store unit 120-3 to access the bank 110-3 and read out a data according to the (c+7)-th access instruction for the load/store unit 120-3 and the bank 110-3. Accordingly, the load/store unit 120-3 reads out the data from the bank 110-3.

The PFU 140 blocks the load/store unit 120-0 from accessing the bank 110-3 and controls the load/store unit 120-0 to read out a data (stored in the buffer 144-0) from the buffer 144-0 according to the (c+7)-th access instruction for the load/store unit 120-0 and the bank 110-3. Accordingly, the load/store unit 120-0 reads out the data from the buffer 144-0.

Similarly, the PFU 140 blocks the load/store unit 120-2 from accessing the bank 110-3 and controls the load/store unit 120-2 to read out a data (stored in the buffer 144-2) from the buffer 144-2 according to the (c+7)-th access instruction for the load/store unit 120-2 and the bank 110-3. Accordingly, the load/store unit 120-2 reads out the data from the buffer 144-2.

FIG. 15B is a view showing the PFT listing (c+8)-th access instructions 872, (c+9)-th access instructions 882, (c+10)-th access instructions 892, and (c+11)-th access instructions 896 when the processor cycle of the processor is the (i+11)-th processor cycle. When the processor cycle of the processor becomes the (i+11)-th processor cycle, the (c+7)-th access instructions 862 are executed, and the table update unit 170 updates the PFT shown in FIG. 14B that is stored in the table storage unit 160 with the PFT shown in FIG. 15B.

FIG. 15C is a view showing the mask table listing (c+8)-th access instructions 874, (c+9)-th access instructions 884, and (c+10)-th access instructions 894 when the processor cycle of the processor is the (i+11)-th processor cycle. The (c+11)-th access instructions 896 shown in FIG. 15C are the same as the (c+11)-th access instructions 896 shown in FIG. 15B.

In this case, when the process cycle of the processor becomes the (i+11)-th processor cycle, the bank conflict prediction unit 180 determines whether or not access instructions that are predicted to cause the bank conflict exist in the (c+11)-th access instructions 896. Referring to FIG. 15B, the access instructions that are predicted to cause the bank conflict do not exist in the (c+11)-th access instructions 896.

Figure 16:
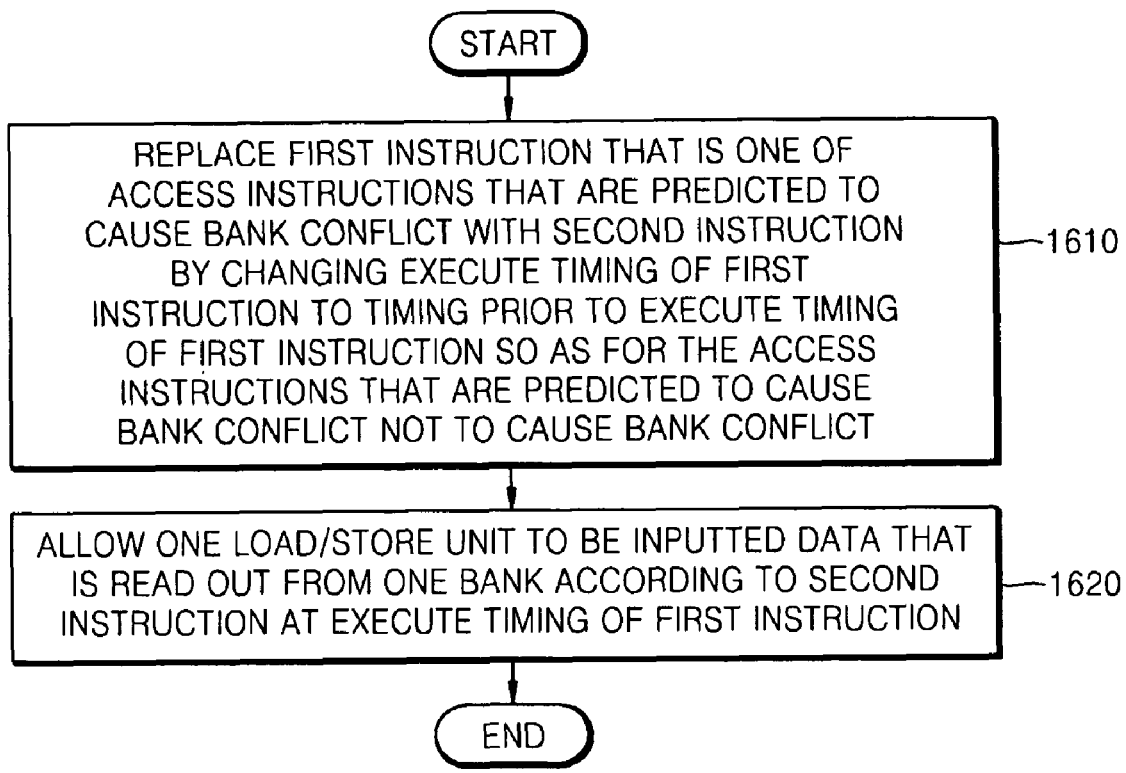
FIG. 16 is a flowchart for explaining a method of avoiding bank conflict according to the present invention.

FIG. 16 is a flowchart for explaining a method of avoiding bank conflict according to the present invention. The method of avoiding bank conflict may include operations 1610 to 1620 for avoiding the bank conflict when occurrence of the bank conflict is predicted.

A scheduling unit (not shown) replaces a first instruction (that is one of access instructions that instruct at least a portion of load/store units to access the same bank 110-n) with a second instruction by changing an execute timing of the first instruction to a timing prior to the execute timing of the first instruction so as for the access instructions (that instruct at least a portion of the load/store units to access the same bank 110-n) among the access instructions allocated to the load/store units 120-1 to 120-N not to instruct at least a portion of the load/store units to access the same bank (operation 1610).

After operation 1610, a switching unit 190 allows one of the load/store units to be inputted a data that is read out from one bank according to the second instruction at the execute timing of the first instruction (operation 1620).

The method of avoiding bank conflict according to the invention can also be written as a program that is executed in a computer, and the program can be recorded on a computer readable recording medium. Examples of the computer readable recording medium include magnetic storage media (e.g., ROM, floppy disks, hard disks, etc.), and optical recording media (e.g., CD-ROMs, or DVDs).

In a method and apparatus for avoiding bank conflict according to the present invention, a first instruction that is one of access instructions that are predicted to cause the bank conflict is replaced with a second instruction by changing an execute timing of the first instruction to a timing prior to the execute timing of the first instruction so as for the access instructions not to cause the bank conflict. Next, a load/store unit that is scheduled to access the bank according to the first instruction accesses the bank and reads out a data from the bank at an execute timing of the second instruction, and after that, the load/store unit is allowed to be inputted the read data at the execute timing of the first instruction. Accordingly, although the access instructions that are predicted to cause the bank conflict are allocated to the load/store units, the bank conflict can be prevented, so that it is possible to avoid a deterioration in performance due the occurrence of the bank conflict.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for avoiding bank conflict comprising:
at least one bank which is prepared in advance;
load/store units, each of which are capable of accessing one bank according to access instructions allocated to the load/store units;
a bank conflict prediction unit which determines whether or not the access instructions that instruct at least a portion of the load/store units to access the same bank exist in the access instructions;
a scheduling unit which replaces a first instruction that is one of the access instructions being determined to access the same bank based on the determination of the bank conflict prediction unit with a second instruction by changing an execute timing of the first instruction to a timing prior to the execute timing of the first instruction; and
a switching unit which allows one of the load/store units to be inputted a data that is read out from the bank according to the second instruction at the execute timing of the first instruction.

2. The apparatus of claim 1,
wherein the scheduling unit comprises:
a table storage unit to store a PFT (pre-fetch table) listing the access instructions,
wherein the bank conflict prediction unit determines based on the stored PFT whether or not the access instructions that instruct at least a portion of the load/store units to access the same bank exist in the access instructions,
wherein the scheduling unit further comprises:
a table update unit which updates the stored PFT by replacing the first instruction listed in the stored PFT with the second instruction in response to a result of the determination, and
wherein the switching unit operates considering the updated PFT.

3. The apparatus of claim 2,
wherein the table storage unit stores a mask table obtained by updating the access instructions for one of the load/store units and one bank listed in the PFT considering at least a portion of the access instructions excluding the access instruction for one of the load/store units and one bank in the PFT,
wherein the table update unit updates the stored mask table by replacing the first instruction listed in the stored mask table with the second instruction in response to the result of the determination, and
wherein the switching unit operates considering the updated PFT corresponding to the updated mask table.

4. The apparatus of claim 1, wherein the switching unit comprises:
a buffer which temporarily store a data that one of the load/store units accessing the one bank reads out from the one bank according to the second instruction; and
a path arbitration unit which allows one of the load/store units to access the one bank and read out a data from the one bank according to the second instruction and to read out the stored data from the buffer at an execute time of the first instruction.

5. The apparatus of claim 1,
wherein the access instructions excluding the first instruction includes an access instruction that instructs one of the load/store units to perform a write operation, and
wherein the first instruction instructs one of the load/store unit to a read operation.

6. The apparatus of claim 1, wherein each of the banks is a single-port bank.

7. A method of avoiding bank conflict in load/store units each of which are capable of accessing one of at least one of banks that are prepared in advance according to access instructions allocated to the load/store units, the method comprising:
(a0) determining whether or not the access instructions that instruct at least a portion of the load/store units to access the same bank exist in the access instructions;
(a) replacing a first instruction that is one of the access instructions being determined to access the same bank based on the result of the determining with a second instruction by changing an execute timing of the first instruction to a timing prior to the execute timing of the first instruction; and
(b) allowing one of the load/store units to be inputted a data that is read out from the bank according to the second instruction at the execute timing of the first instruction.

8. The method of claim 7,
wherein (a0) is performed based on a PFT (pre-fetch table) listing the access instructions, and
wherein (a) comprises:
(a2) updating the PFT by replacing the first instruction listed in the PFT with the second instruction, and
wherein (b) is performed considering the updated PFT.

9. The method of claim 8,
wherein in (a2), a mask table is updated by replacing the first instruction listed in the mask table with the second instruction, wherein the mask table is obtained by updating the access instruction for one of the load/store units and one bank listed in the PFT considering at least a portion of the access instructions excluding the access instruction for one of the load/store units and one bank in the PFT, and
wherein (b) is performed considering the updated PFT corresponding to the updated mask table.

10. The method of claim 7, wherein (b) comprises:
allowing one of the load/store units to access the one bank and read out a data from the one bank according to the second instruction;
temporarily storing the data that one of the load/store units accessing the one bank reads out from the one bank according to the second instruction in a buffer that is prepared in advance; and
allowing the one of the load/store units to read out the stored data from the buffer at an execute timing of the first instruction.

11. The method of claim 7, wherein the access instructions excluding the first instruction includes an access instruction that instructs one of the load/store units to perform a write operation, and wherein the first instruction instructs one of the load/store unit to a read operation.

12. The method of claim 7, wherein each of the banks is a single-port bank.

13. A non-transitory computer-readable recording medium having embodied thereon a computer program for the method of any one of claims 7 to 12.

* * * * *